United States Patent [19]
Hall

[11] Patent Number: 5,265,556
[45] Date of Patent: Nov. 30, 1993

[54] ADVANCE WARNING TRAFFIC SAFETY DEVICE

[76] Inventor: J. Rodney Hall, 310 Blucher Cir., Lake Wylie, S.C. 29710

[21] Appl. No.: 965,159

[22] Filed: Oct. 23, 1992

[51] Int. Cl.$^5$ .......................... E01F 9/04; G08G 1/01
[52] U.S. Cl. ........................... 116/63 P; 116/142 FP; 404/9
[58] Field of Search .................... 404/9, 10; 116/63 R, 116/63 P, 67 R, 70, 142 FP, 137 R

[56] References Cited

U.S. PATENT DOCUMENTS

| | | | |
|---|---|---|---|
| 2,966,877 | 1/1961 | Konold et al. | 116/67 R |
| 3,179,416 | 4/1965 | Büdi | 116/67 R |
| 3,880,537 | 4/1975 | Harris et al. | 404/10 X |
| 5,160,111 | 11/1992 | Hugron | 404/10 X |
| 5,168,827 | 12/1992 | Junker | 116/63 P |

Primary Examiner—Ramon S. Britts
Assistant Examiner—James A. Lisehora
Attorney, Agent, or Firm—Shefte, Pinckney & Sawyer

[57] ABSTRACT

The present invention provides an advance warning traffic safety device for warning pedestrians, members of a road work crew, and other persons adjacent a road that a vehicle has strayed from the proper traffic path on the road and may endanger such persons. The advance warning safety device provides an audible alarm which serves as an advance warning to such persons downroad of the traffic safety device. The traffic safety device includes a pressurized fluid container for supplying compressed air to a plurality of horns in response to a vehicle collision with the traffic safety device. An initiator mechanism for initiating the audible alarm includes a frangible gas cap which prevents release of the compressed air to the horns until broken by a plunger-type component, which is moved into glass or other breakable materials breaking contact with the cap by a pendulum device which pivots in response to displacement of the traffic safety device from its generally free standing position adjacent the road in response to a vehicle collision with the traffic safety device.

16 Claims, 5 Drawing Sheets

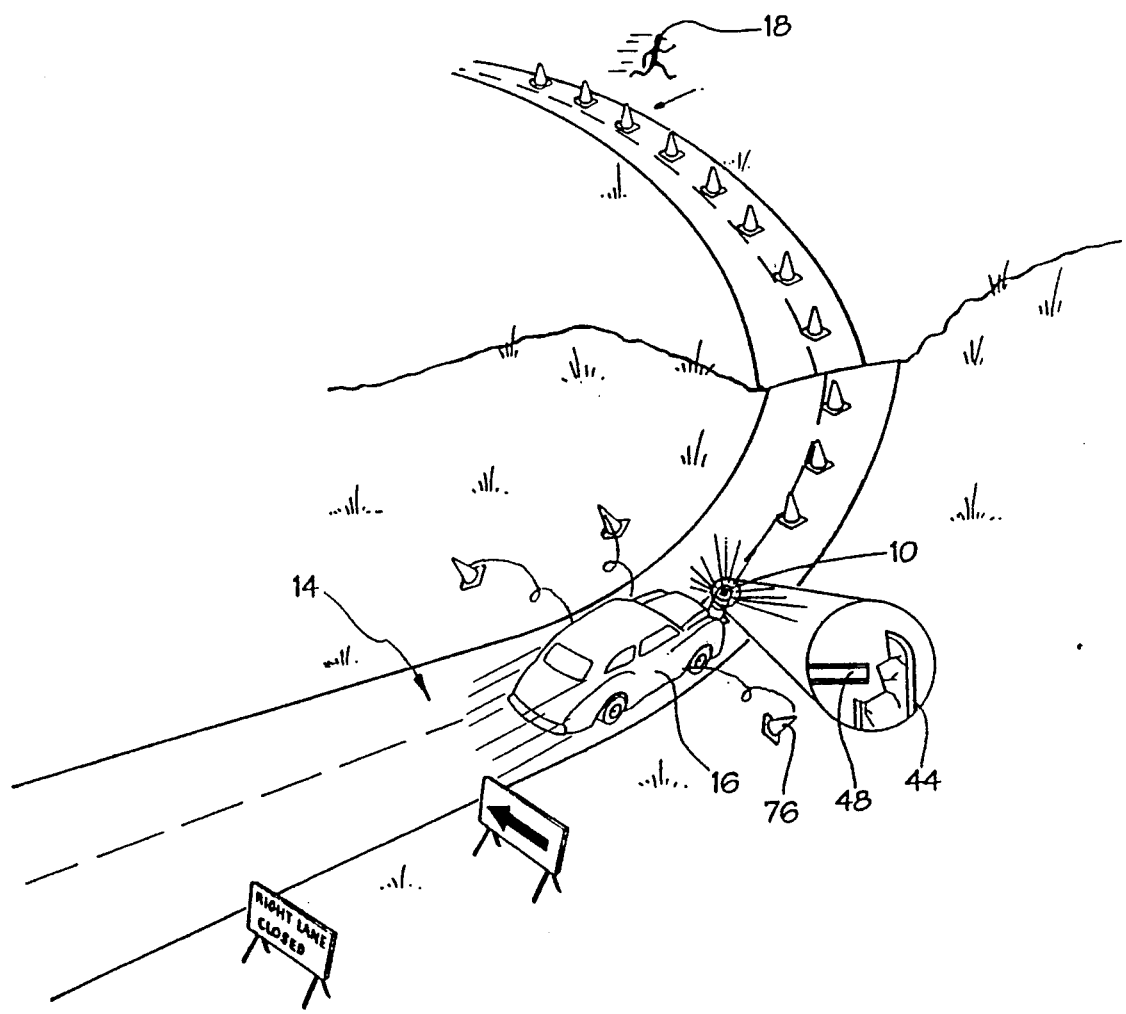

ADVANCE WARNING TRAFFIC SAFETY DEVICE

BACKGROUND OF THE INVENTION

The present invention relates to an advance warning traffic safety device and, more particularly, to an advance warning traffic safety device for alerting pedestrians, members of a road work crew, and other persons of impending vehicular danger so that such persons can avoid being endangered by a vehicle straying from a road.

Although roads customarily are provided with striped and solid lines to demarcate traffic lanes and other boundaries, situations arise in which it is necessary to direct vehicular traffic out of a permanently demarcated traffic lane and along a temporarily demarcated traffic lane. Such situations arise, for example, when a road construction or repair crew is operating on or near a road and, in this situation, it becomes necessary to guide the vehicular traffic on the existing road out of the way of moving construction equipment. More importantly, it is necessary to direct the vehicular traffic in such a manner that the road construction or repair people are not endangered.

Numerous physical barrier-type traffic lane demarcators have been proposed to serve the dual function of directing traffic around a road construction or repair site as well as to safeguard the safety of the road construction or repair workers. For example, U.S. Pat. No. 5,104,254 to Durand discloses a traffic divider. Also, U.S. Pat. No. 4,515,499 to Furiate discloses a concrete traffic barrier of the type commonly referred to as a "New Jersey" barrier which not only delineates a border defining the construction area into which vehicles should not travel but, additionally, is of a size and weight to actually physically deter vehicles from crossing into the construction area. The Furiate traffic lane delineator additionally includes a sound generating device in the form of a plurality of alternating raised tabs and open regions extending outwardly from the bottom of the concrete barrier. In the event a vehicle strays too closely to the concrete barrier, the tires of the vehicle travel over the alternating raised tabs and open recesses and this motion creates an audible sound to alert the driver to steer the vehicle away from the concrete barrier.

Although weighted physical barriers enhance the safety of a road work site, their relatively heavy weight and size adds to the cost and difficulty in deploying these types of barriers in the manner needed to ensure the safety of a road work site. As a result, many road work crews depend on relatively lightweight traffic delineators such as plastic cones or barrels which have a bright reflective color to visibly alert drivers to either follow a new, temporarily delineated traffic lane or to alert drivers that they are approaching a road work site. While relatively easy to deploy, such lightweight visible traffic lane delineators do not enhance the physical safety of the road work site in any manner, as an errant vehicle which strays from the proper vehicle path will drive over or knock aside such traffic lane delineators. Moreover, none of these barriers provide an advance warning capability which could alert pedestrians, work crew members and others near a crash site to impending danger. Accordingly, the need still exists for improvements in traffic lane delineators which can reduce the risk of injury or life-threatening situations while being of a size and weight which advantageously permits easy deployment and storage of the device.

SUMMARY OF THE INVENTION

The present invention provides a traffic safety device which operates in a stand-alone condition without the need for operator monitoring. Moreover, the traffic safety device of the present invention is of a relatively compact size and a relatively light weight which permits convenient deployment and storage of the device. Moreover, the energy sources required for operating the traffic safety device of the present invention have a relatively longer shelf life than conventionally known batteries or other portable electric energy sources and so the traffic safety device can be deployed for long periods of time with the need for only occasional checking of the status of the energy source. Furthermore, the energy source can be non-toxic and contains no pyrotechnical materials. In fact, since the traffic safety device of the present invention does not even require batteries or another electrical power source, there is no need to be concerned with the need to cyclically recharge or replace batteries. Moreover, since the energy sources required for operating the traffic safety device can comprise, for example, non-toxic, relatively long life compressed gases, the need for replenishing such energy sources is reduced. Additionally, the depletion of such energy sources can be readily checked by those responsible for deploying the traffic safety device and, if need be or desired, such compressed gas energy sources can be recharged in the field—i.e., recharged at the actual traffic location in which the traffic safety device is deployed.

Briefly described, the present invention provides an advance warning traffic safety device which includes a support structure, an audible alarm means, and an activating means. The support structure supports the traffic safety device in a displaceable, generally free standing position adjacent a vehicle traffic path from which the traffic safety device is displaceable upon a collision therewith by a vehicle which has strayed from the traffic path. The activating means activates the audible alarm means in response to displacing movement of the traffic safety device, the audible alarm means being operable to broadcast an alarm to warn persons down road of the traffic safety device of the errant vehicle.

According to one aspect of the present invention, the activating means includes an initiator portion movably supported on the support structure and a receipt portion operably connectable to the audible alarm means. The initiator portion is movable in an initiating movement from a repose position in the generally free standing position of the traffic safety device to a shifted position in response to a vehicle collision with the traffic safety device and the receipt portion is operable to activate the audible alarm means in response to initiating movement of the initiator portion.

According to additional features of the one aspect of the present invention, the audible alarm means includes a sound generating portion and a portion for supplying energy to the sound generating portion and the receipt portion includes means for controllably releasing energy from the supplying portion to the sound generating portion in response to an initiating movement of the initiator portion. The sound generating portion preferably includes a horn and the supplying portion preferably includes means for supplying gaseous fluid under pressure to the horn to thereby generate sound from the horn. Also, the receipt portion preferably includes means for controlling the supply of pressurized gaseous fluid to the horn.

According to still other features of the one aspect of the present invention, the initiator portion includes a pendulum element mounted in depending manner on the support structure for substantially free swinging movement, the pendulum element swinging from a repose position to a shifted position in response to displacing movement of the traffic safety device, and the receipt portion includes a contact element disposed relative to the pendulum element for contact thereby during swinging movement of the pendulum element from its repose position to its shifted position. Also, the supplying portion includes a container having pressurized gaseous fluid therein and having an outlet for release therethrough of pressurized gaseous fluid, a gaseous fluid conduit assembly for guiding gaseous fluid which has been released from the container to the horn, and valve means for selectively communicating the container with the conduit assembly. The contact element is operable to dispose the valve means in an open condition in which gaseous fluid is permitted to flow from the container to the horn via the conduit assembly in response to contact of the pendulum element with the contact element.

In the preferred embodiment of the advance warning traffic safety device, the valve means includes a frangible seal substantially completely sealing the container outlet in an unbroken condition of the frangible seal and permitting the passage of pressurized gaseous fluid from the container outlet into the conduit assembly in a broken condition of the frangible seal. Also, in the preferred embodiment, the container outlet has an axis and the contact element includes a plurality of slider components and means for supporting the slider components in respective angularly spaced positions relative to the outlet axis for sliding movement of the slider components relative to the frangible seal. Additionally, the device preferably includes a plurality of pendulum elements in addition to the first-mentioned pendulum element, each pendulum element being disposed relative to a respective slide component for moving the slide component into seal breaking contact with the frangible seal in response to a vehicle collision with the traffic safety device.

According to additional features of the preferred embodiment of the advance warning traffic safety device, there is provided means for resiliently biasing each slide component into a non-contact position at a spacing from the frangible seal, the resiliently biasing means yieldingly permitting sliding movement of each slide component in response to contact therewith of the respective associated pendulum element. Also, there is provided means for selectively disabling each slide component and its associated pendulum element from cooperative movement therebetween resulting in breaking of the frangible seal, the selectively disabling means being operable to prevent undesired breaking of the frangible seal during transport and storage of the traffic storage device.

In its preferred form, the means for supporting the slide components is in the form of a collar generally coaxial to the container outlet axis and the selectively disabling means includes a collar ring rotatably supported on the collar and angularly movable between a non-disabling position in which each slide component can be moved into seal breaking contact with the frangible seal and a disabling position in which each slide component is disabled from movement into seal breaking contact with the frangible seal.

The present invention thus provides an advance warning traffic safety device which, in its preferred embodiment, includes a support structure for supporting the traffic safety device in a displaceable, generally free standing position adjacent a vehicle traffic path from which the traffic safety device is displaceable upon collision therewith by a errant vehicle which has strayed from the traffic path and a horn for broadcasting an audible alarm to warn persons down road of the traffic safety device of an errant vehicle collision with the traffic safety device.

Also, the device includes a container having pressurized gaseous fluid therein and an outlet for release therethrough of pressurized gaseous fluid and a gaseous fluid conduit assembly for guiding pressurized gaseous fluid which has been released from the container to the horn to thereby produce an audible alarm. Furthermore, the device includes a frangible cap sealingly disposed on the container outlet for preventing release of pressurized gaseous fluid from the container into the conduit assembly and an initiator device for breaking the frangible cap in response to a vehicle collision with the traffic safety device to thereby effect release of gaseous fluid to the horn for sounding an audible alarm.

BRIEF DESCRIPTION OF THE DRAWINGS

FIG. 5 is a schematic perspective view of a vehicle traffic situation and showing the traffic safety device in an alarm activated condition following a vehicle collision therewith.

DETAILED DESCRIPTION OF THE PREFERRED EMBODIMENT

Figure 2:
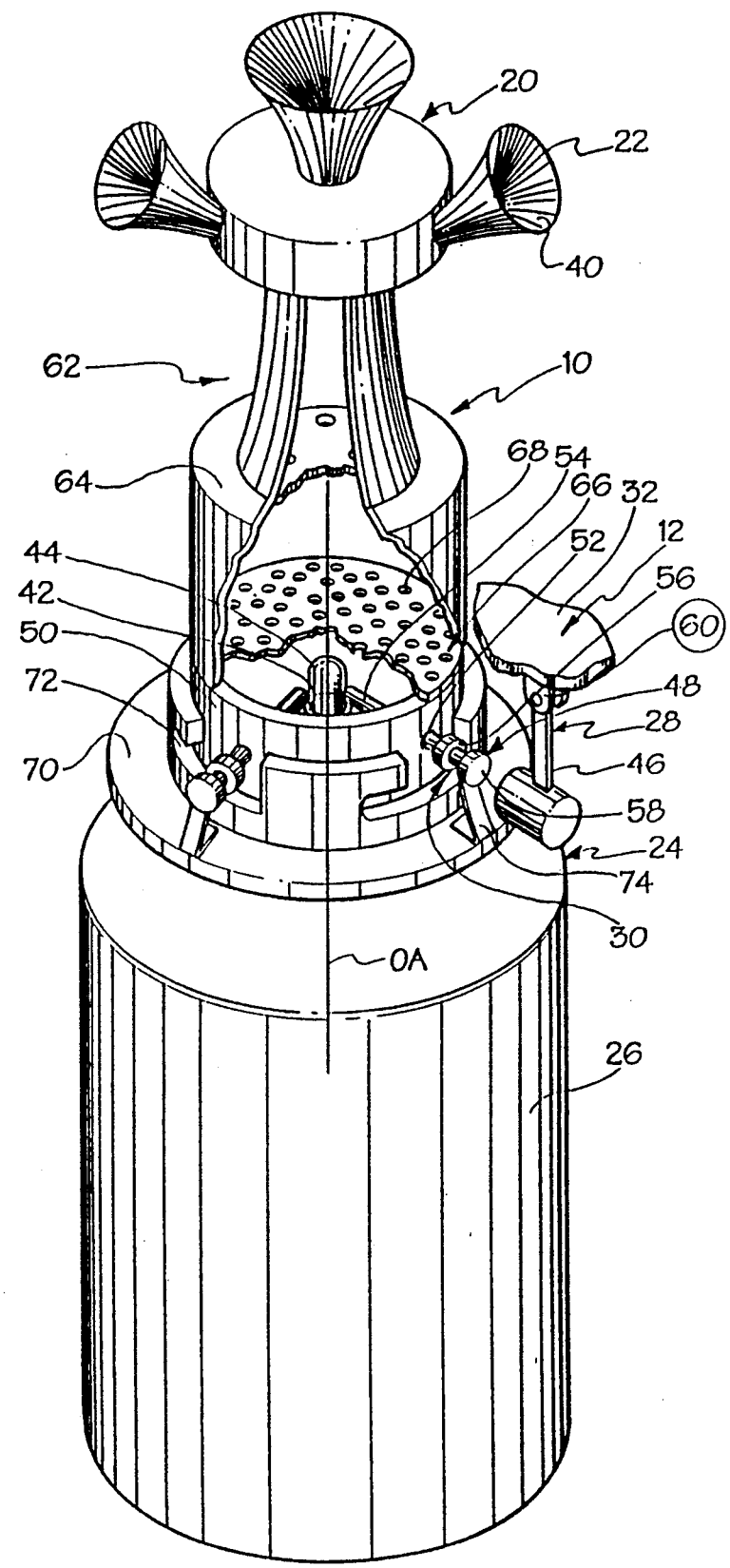
FIG. 2 is an enlarged perspective view, in partial vertical section, of the traffic safety device shown in FIG. 1 and showing several features of the audible alarm means and the activating means of the traffic safety device in a repose position thereof.
Figure 3:
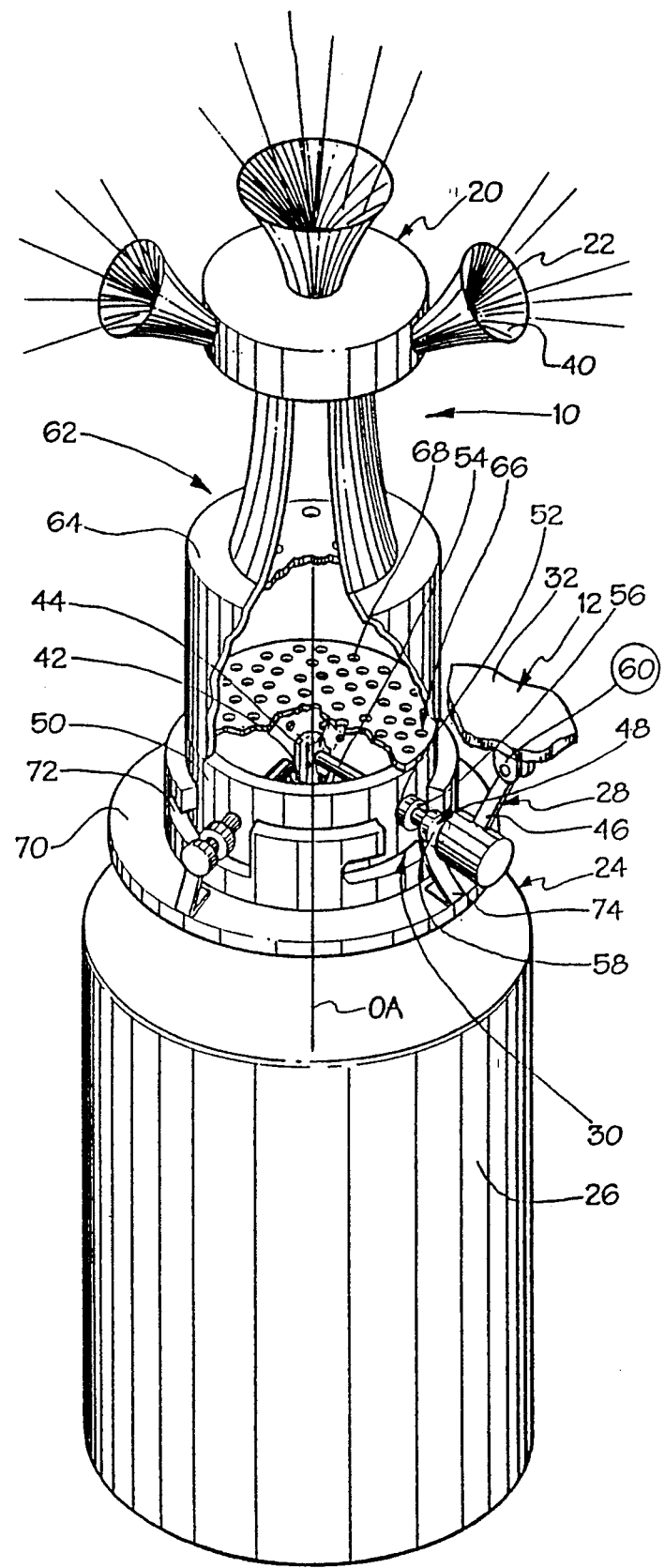
FIG. 3 is an enlarged perspective view, in partial vertical section, of the traffic safety device shown in FIG. 1 and showing the audible alarm means and the activating means thereof in an alarm activated disposition of the traffic safety device.
Figure 4:
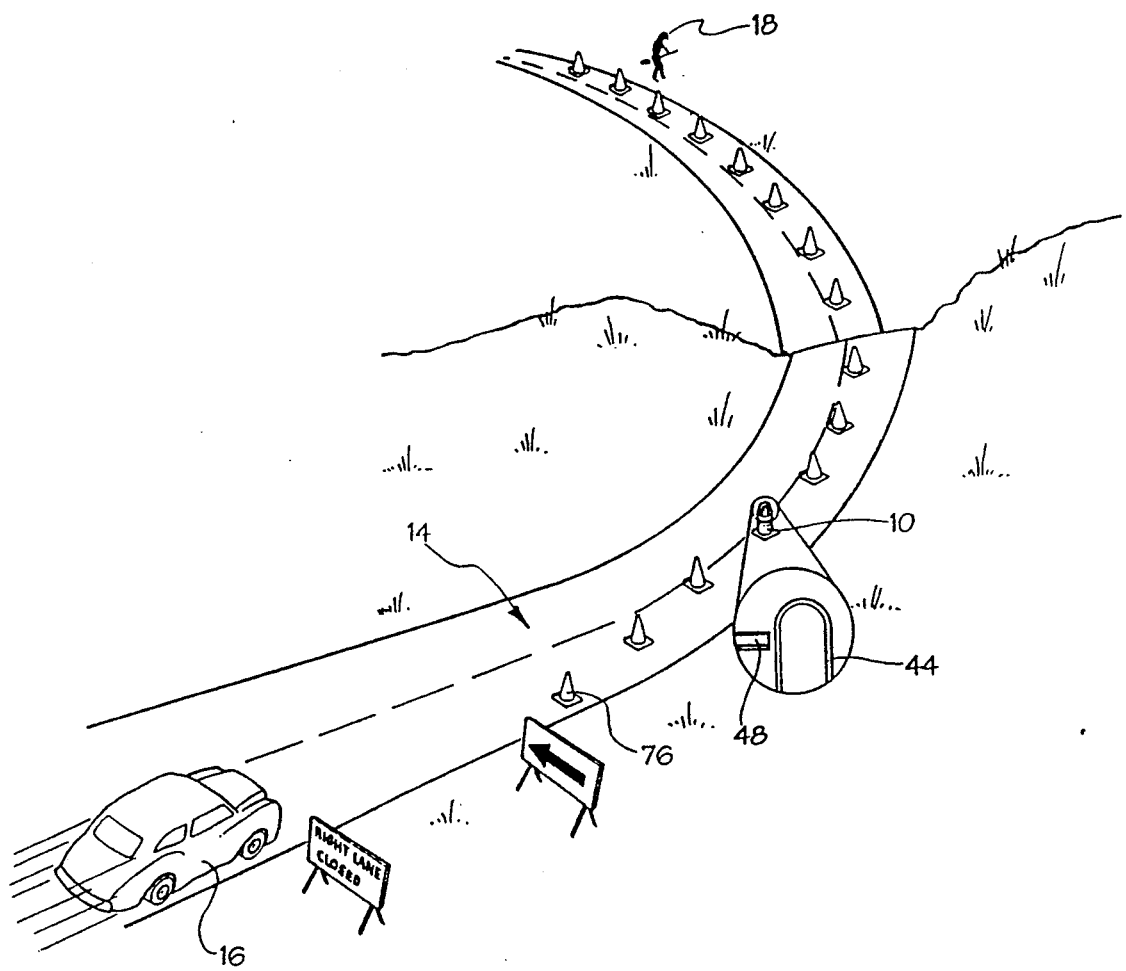
FIG. 4 is a schematic perspective view of a vehicle traffic situation and showing the traffic safety device in its reposed position adjacent a vehicle traffic path.

As seen in FIGS. 1-5, the preferred embodiment of the advance warning traffic safety device of the present invention is illustrated and generally designated by the reference numeral 10. The traffic safety device 10 includes a support structure 12 for supporting the traffic safety device in a yieldable generally free standing position adjacent a vehicle traffic path such as, for example, a roadway 14 as seen in FIGS. 4 and 5 along which cars, trucks, buses, and other motorized vehicles travel. The traffic safety device 10 is operable to sound a warning if it is displaced from its free standing position upon a collision therewith by an errant vehicle such as, for example, an automobile 16 as shown in FIGS. 4 and 5, which has strayed from the vehicle traffic path. Thus, the traffic safety device 10 advantageously provides advance warning to persons adjacent the vehicle traffic path such as, for example, a road repair person 18 as seen in FIGS. 4 and 5, so that such persons can move to a position of safety before the continued travel of the errant vehicle has created an injury or life threatening situation.

As seen in particular in FIGS. 2 and 3, the traffic safety device 10 includes, in addition to the support structure 12, an audible alarm means having a sound generating portion 20 which includes a plurality of horns 22 and a supplying portion 24 having a container 26 for supplying a pressurized gaseous fluid such as, for example, compressed air. The traffic safety device 10 also includes means for activating the audible alarm means in response to displacing movement of the traffic safety device from its free standing position adjacent a vehicle traffic path. The activating means includes an initiator portion 28 movably supported on the support structure 12 and a receipt portion 30 operatively connected to the audible alarm means for activating the audible alarm means to broadcast an alarm in response to a vehicle collision with the traffic safety device 10.

The support structure 12 preferably includes a contact surface for contact by a vehicle colliding with the traffic safety device 10 and the contact surface is preferably in the form of a shell 32. The shell 32 encloses the audible alarm means (except for portions of the horns 22) and the activating means in a housing which protects these components against weather elements as well as vandalism. The shell 32 includes a cylindrical body portion 34 which is mounted on a base plate 36 of the support structure 12 and a handle portion 38 which permits easy transport and placement of the traffic safety device 10. The shell 32 is preferably as compact as possible to permit cost effective transport and storage of the traffic safety device 10 while still providing adequate structural support and protection for the components of the traffic safety device housed within the shell. Additionally, the shell 32 is preferably formed of a durable yet resiliently yieldable material such as, for example, a high impact plastic which resiliently deforms upon the application of a deflecting force thereto and which returns to its original form upon the cessation of the deflecting force.

Figure 1:
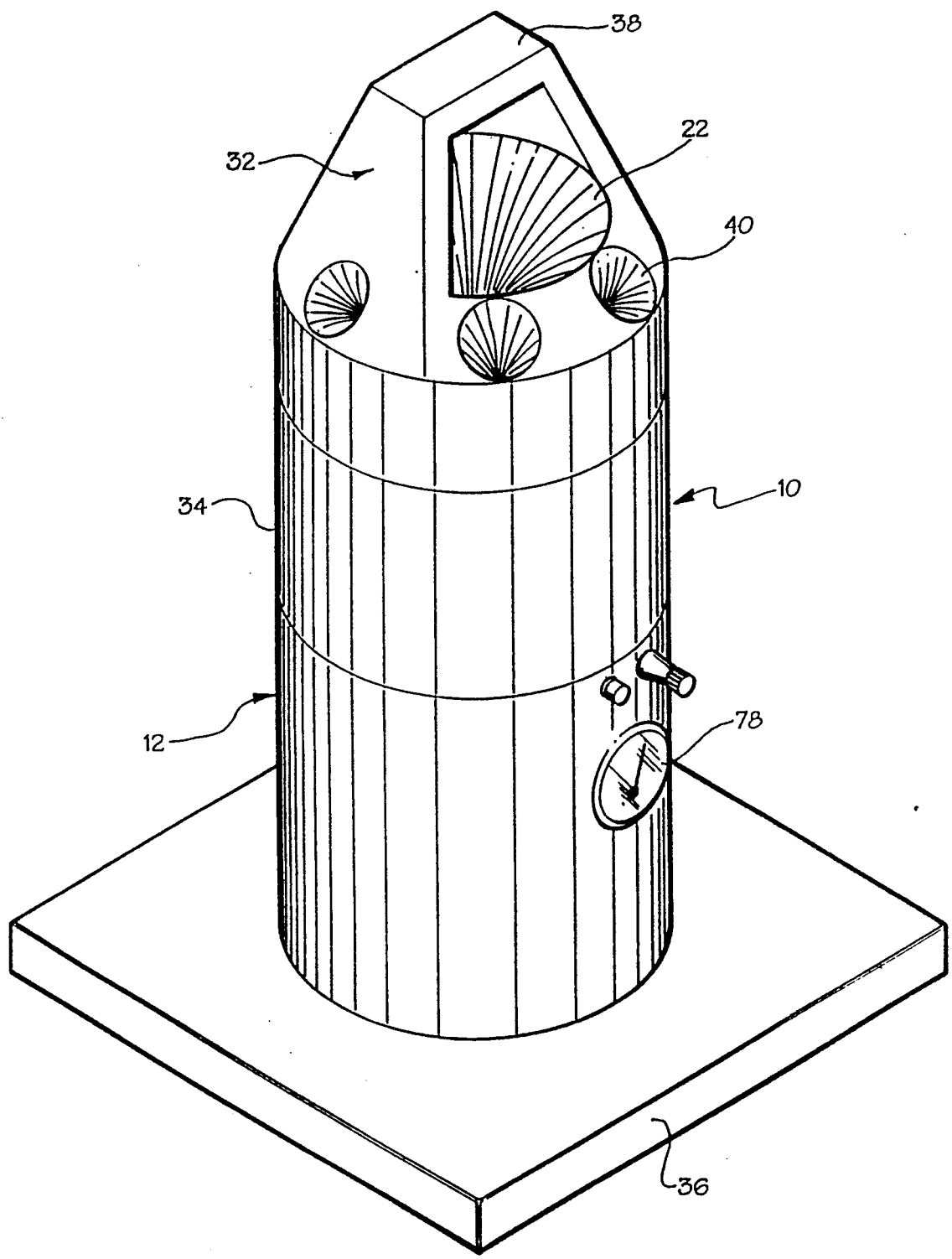
FIG. 1 is a perspective view of the preferred embodiment of the traffic safety device of the present invention.

Each horn 22 includes a bell opening 40 and, as seen in FIG. 1, the bell openings 40 are supported in uncovered condition by the shell 32 for unrestricted release of sound generated by the horns 22.

As seen in FIG. 2, the container 26 is supported in an upright position on the base plate 36 and includes an outlet 42 at the top center of the container. A valve means in the form of a frangible glass or other breakable materials cap 44 is mounted in sealing relationship on the outlet 42 to prevent the release of pressurized gaseous fluid from the container 26. The container outlet 42 forms a vertical outlet axis OA extending transversely to the base plate 36.

As seen in FIG. 2, the initiator portion 28 of the activating means includes a plurality of pendulum elements 46 each pivotally mounted to the support structure 12 in a depending manner which permits substantially free swinging movement of the pendulum element in a vehicle collision situation, as described in more detail below. The receipt portion 30 of the activating means includes a plurality of contact elements each in the form of a slide component 48.

The slider components 48 are mounted in respective angularly spaced positions about the frangible cap 44 relative to the outlet axis OA by a means for supporting the slider components in the form of an annular collar 50 having a plurality of slide bores 52 formed at equal angular spacings about the circumference of the annular collar. The annular collar 50 is fixedly mounted to the support structure 12 coaxial to the outlet axis OA generally at the height of the frangible cap 44 and the axis of each bore 52 is on a radius of the outlet axis OA extending from the outlet axis at the axial location of the frangible cap 44. Each slide component 48 includes a cylindrical plunger portion 54 which is slidably received in a bore 52 of the annular collar 50, a spacer collar 56, and a head portion 58. The spacer collar 56 is coaxially mounted to the cylindrical plunger portion 54 and has a greater radius than the cylindrical plunger portion. The spacer collar 56 is fixedly mounted to the cylindrical plunger portion 54 at a predetermined axial position thereof for limiting the sliding movement of the slide component 48 relative to the respective bore 52, as will be described in more detail below.

Each pendulum element 46 is pivotally mounted to the support structure 12 by a pivot 60, as seen in FIG. 2, which is angularly aligned, relative to the outlet axis OA, with the respective slider component 48 associated with the pendulum element 46. Each pendulum element 46 includes a weighted lower portion which maintains the pendulum element in a downward disposition in the repose position of the pendulum element. Each pendulum element is pivotally supported for pivoting about a pivot axis which is transverse to the axis of sliding movement of the associated slider component 48 and each pendulum element hangs in a downward disposition in which its weighted lower end is spaced from the head portion 58 of the associated slider component 48 in a repose position of the pendulum element while the traffic safety device 10 is in its free standing condition adjacent a vehicle traffic path.

Upon displacing movement of the traffic safety device 10 from its free standing condition due to a vehicle collision, the cylindrical portion 34 of the support structure 12 may deviate from its normal upright condition and the forces of gravity act on the free swinging pendulum elements 46 such that the weighted lower end of at least one pendulum element 46 pivots about its pivot 60 into contact with the head portion 58 of an associated slide component 48 to thereby effect radially inward sliding movement of the slider component into seal breaking contact with the frangible cap 44. Alternatively, in the event of a vehicle collision with the traffic safety device 10, the cylindrical portion 34 of the support structure 12 may remain in its normal upright orientation but the resulting momentum imparted to at least one of the pendulum elements 46 as a result of the vehicle collision causes the respective pendulum element or elements to pivot about the pivot or pivots 60 and thereby initiate sliding movement of at least one slide component 48 into seal breaking contact with the frangible cap 44.

As seen in FIG. 3, when a slide component 48 moves into seal breaking contact with the frangible cap 44, the glass or other breakable materials of the frangible cap is broken and gaseous fluid is immediately released from the container 26. To efficiently guide the released pressurized gaseous fluid to the horns 22, the traffic safety device 10 includes a gaseous fluid conduit assembly 62 which includes a housing 64 having an annular bottom portion mounted in sealed relation to the top of the annular collar 50 and an annular top open portion communicated with the sound generating portion 20. A cylindrical glass or other breakable materials containment screen 66 mounted adjacent the bottom portion of the housing 64 and having a plurality of screen holes 68 for permitting pressurized gaseous fluid to flow therethrough. The screen holes 68 are preferably of a small size for preventing fragments of broken glass or other breakable materials from passing through the screen. The housing 64 of the conduit assembly 62 tapers towards its top open portion to effectively concentrate the pressurized gaseous fluid as it reaches the sound generating portion 20.

The traffic safety device 10 also includes means for disabling the slide components 48 and the pendulum elements 46 from cooperative operation together resulting in seal breaking contact in the form of an annular slotted ring 70 rotatably supported on the support structure 12 for rotation about the annular collar 50. The slotted ring 70 includes a plurality of slots 72 each for receiving the cylindrical plunger portion 54 of a respective one of the slide components 48 therein during rotational movement of the slotted ring 70 from a non-disabled position in which each slide component is free to slide relatively in its associated bore 52 and a disabled position in which the slotted ring 70 is interposed between the spacer collar 56 and the head portion 58 of each slide component 48 to prevent sliding movement of the slide components. The slotted ring 70 is placed in its disabled position to prepare the traffic safety device 10 for transport or storage and can be readily moved to its non-disabled position once the traffic safety device 10 is disposed adjacent a vehicle traffic path.

The traffic safety device 10 also includes a plurality of spring steel plates 74. Each spring steel plate 74 is mounted to the slotted ring 70 and has a free end which extends inwardly of the head portion 58 of a respective slide component 48 to engage the head portion during radially inward movement of the slide component to thereby apply a biasing force of a predetermined degree to the slide component acting in a direction opposite to the direction of sliding movement. The magnitude of the biasing force of the spring steel plates 74 is selected such that the slide components 48 are blocked from sliding movement if only a slight force is applied thereto such as, for example, slight contact by a pendulum element 46 due to jarring of the traffic safety device 10 but permitting the biasing force to be overcome upon the application of a greater force.

As seen in FIGS. 4 and 5, the traffic safety device 10 is placed in a free standing position adjacent a vehicle traffic path such as a road 14 at a location preferably several hundred feet from a downroad location downstream from the traffic safety device 10 relative to vehicle travel at which persons such as the road repair person 18 may be apt to be near or on the road 14. If desired, the traffic safety device 10 can be disposed in a row of conventional visual traffic warning devices such as, for example, a row of conventional traffic safety cones 76 and, in this situation, the traffic safety device 10 can itself function as a visual traffic safety warning. In any event, the traffic safety device 10 should be disposed at a location at which contact between the traffic safety device and a vehicle straying from the roadway 14 is assured so that an audible warning will be sounded to alert the persons at the down road location that an errant vehicle has strayed from the proper path on the road 14 and may be in danger of colliding with persons at the down road location.

In its free standing condition, the traffic safety device 10, as seen in FIG. 4, is supported on the base plate 36 on the road 14 and all of the slide components 48 are spaced from the frangible cap 44 which, due to its sealing relationship with the container outlet 42, prevents the passage of pressurized gaseous fluid from the container 26 to the horns 22. However, as seen in FIG. 4, if a vehicle such as the automobile 16 strays from the proper traffic path on the road 14, the automobile will collide with the traffic safety device 10 and thereby displace the traffic safety device from its free standing initial position on the road 14.

The displacing movement of the traffic safety device 10 leads to pivoting of at least one of the pendulum elements 46 about its pivot 60 in such a manner that the pendulum element contacts the associated slide component 48 to propel the slide component in a radially inward direction against the bias of its associated spring steel plate 74 toward the frangible cap 44. The cylindrical plunger portion 54 of the slide component 48 breaks the frangible cap 44, thereby immediately releasing the pressurized gas fluid which, due to its pressurized condition, immediately flows through the screen holes 68 of the glass or other breakable materials containment screen 66, through the housing 64 of the conduit assembly 62 and into the sound generating portion 20 at which it disperses into the horns 22. The horns 22 blare as the pressurized gaseous fluid escapes through the horns to the atmosphere and those persons in the down road location are thereby provided with an advance warning that an errant vehicle situation has occurred. The alerted persons can then quickly move away from the road 14 or to a protected position in sufficient time before the errant vehicle can travel between the location at which it initially collided with the traffic safety device 10 and the down road location at which the persons have received the alarm.

The present invention contemplates that the container 26 can be operatively connected to a display means such as, as seen in FIG. 1, a pressure indicating dial 78, which would allow an operator to readily monitor the status of the pressurized gaseous fluid. Additionally, the present invention contemplates that the support structure 12 can be configured so as to allow easy removal and replacement of the container 26 with another container having pressurized gaseous fluid. Also, it is contemplated that the skin 32 of the traffic safety device 10 can be provided with appropriate reflective painting or markers to enhance the visual safety aspect of the device. Additionally, it is contemplated that other mechanical arrangements for activating the horns 22 can be employed with equal effect and, even, chemically-based or electronically-based arrangements can be used in lieu of the pendulum element and slide component arrangement of the present embodiment of the traffic safety device 10.

In addition to warning pedestrians, work crew members, and others at or near a collision site, the traffic safety device 10 provides the additional benefit of ensuring that the driver is aware that he or she has strayed from the proper vehicle path and that injury or property damage may result if immediate evasive action is not undertaken.

In connection with this additional benefit, the present invention also contemplates that the traffic safety device 10 can be deployed at an unmanned location such as, e.g., a daytime road construction site during nighttime hours, to provide not only the benefit of alerting pedestrians or others in the vicinity of the work site but, additionally, to provide the benefit of alerting the driver of the vehicle which has collided with the traffic safety device that danger is eminent. This latter advantage may be especially beneficial in a circumstance in which the driver is drowsy or otherwise not fully alert for the attendant driving conditions. In such a circumstance, if the traffic safety device 10 is deployed at a sufficient distance before the unmanned traffic site, the driver may be sufficiently alerted after collision with the traffic safety device to quickly undertake a danger avoiding measure such as, for example, by steering the vehicle away from the work site.

While the amount of advance warning will vary depending upon the spacing of the traffic safety device 10 from the work site or other location at which people will be present, the weather conditions, and other factors, it can be seen that the traffic safety device can potentially provide a relatively significant advance warning. For example, if the traffic safety device 10 is deployed at a one-quarter mile spacing upstream from a work site and if a car traveling 60 miles per hour were to collide with the traffic safety device and continue to travel after collision at 60 miles per hour, approximately a full 15 seconds would elapse between the collision with the traffic safety device 10 and the later impact of the car with a structure at the work site. During the 15 second advance warning period, those persons near or adjacent the work site could quickly react to move to a safer location and, additionally, the driver of the vehicle could undertake corrective action.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An advance warning traffic safety device comprising:
   a support structure having a base portion constructed for disposing said support structure in a displaceable, generally free standing position adjacent a vehicle traffic path from which the support structure is displaceable upon a collision therewith by an errant vehicle which has strayed from the traffic path;
   an audible alarm means mounted in said support structure; and
   means mounted in said support structure for activating the audible alarm means in response to a lateral displacing movement of said support structure by the errant vehicle, the audible alarm means being operable to broadcast an alarm to warn persons down road of the traffic safety device of the errant vehicle.

2. An advance warning traffic safety device according to claim 1 wherein the activating means includes an initiator portion movably supported on the support structure and a receipt portion operably connectable to the audible alarm means, the initiator portion being movable in an initiating movement from a repose position in the generally free standing position of said support structure to a shifted position in response to a vehicle collision with the traffic safety device and the receipt portion being operable to activate the audible alarm means in response to initiating movement of the initiator portion.

3. An advance warning traffic safety device according to claim 2 wherein the audible alarm means includes a sound generating portion and a portion for supplying energy to the sound generating portion and the receipt portion includes means for controllably releasing energy from the supplying portion to the sound generating portion in response to an initiating movement of the initiator portion.

4. An advance warning traffic safety device according to claim 3 wherein the sound generating portion includes a horn, the supplying portion includes means for supplying gaseous fluid under pressure to the horn to thereby generate sound from the horn, and the receipt portion includes means for controlling the supply of pressurized gaseous fluid to the horn.

5. An advance warning traffic safety device according to claim 4 wherein the initiator portion includes a pendulum element mounted in depending manner on the support structure for substantially free swinging movement, the pendulum element swinging from a repose position to a shifted position in response to displacing movement of said support structure, and the receipt portion includes a contact element disposed relative to the pendulum element for contact thereby during swinging movement of the pendulum element from its repose position to its shifted position.

6. An advance warning traffic safety device according to claim 5 wherein the supplying portion includes a container having pressurized gaseous fluid therein and having an outlet for release therethrough of pressurized gaseous fluid, a gaseous fluid conduit assembly for guiding gaseous fluid which has been released from the container to the horn, and valve means for selectively communicating the container with the conduit assembly, and the contact element is operable to dispose the valve means in an open condition in which gaseous fluid is permitted to flow from the container to the horn via the conduit assembly in response to contact of the pendulum element with the contact element.

7. An advance warning traffic safety device according to claim 6 wherein the valve means includes a frangible seal substantially completely sealing the container outlet in an unbroken condition of the frangible seal and permitting the passage of pressurized gaseous fluid from the container outlet into the conduit assembly in a broken condition of the frangible seal.

8. An advance warning traffic safety device according to claim 7 wherein the container outlet has an axis and the contact element includes a plurality of slider components and means for supporting the slider components in respective angularly spaced positions relative to the outlet axis for sliding movement of the slider components relative to the frangible seal and further comprising a plurality of pendulum elements in addition to the first-mentioned pendulum element, each pendulum element being disposed relative to a respective slide component for moving the slide component into seal breaking contact with the frangible seal in response to a vehicle collision with the traffic safety device.

9. An advance warning traffic safety device according to claim 8 and further comprising means for resiliently biasing each slide component into a non-contact position at a spacing from the frangible seal, the resiliently biasing means yieldingly permitting sliding movement of each slide component in response to contact therewith of the respective associated pendulum element.

10. An advance warning traffic safety device according to claim 9 and further comprising means for selectively disabling each slide component and its associated pendulum element from cooperative movement therebetween resulting in breaking of the frangible seal, the selectively disabling means being operable to prevent undesired breaking of the frangible seal during transport and storage of the traffic storage device.

11. An advance warning traffic safety device according to claim 10 wherein the means for supporting the slide components is in the form of a collar generally coaxial to the container outlet axis and the selectively disabling means includes a collar ring rotatably supported on the collar and angularly movable between a non-disabling position in which each slide component can be moved into seal breaking contact with the frangible seal and a disabling position in which each slide component is disabled from movement into seal breaking contact with the frangible seal.

12. An advance warning traffic safety device according to claim 3 wherein the supplying portion includes a container having pressurized gaseous fluid therein and having a valve means for release therethrough of pressurized gaseous fluid, a gaseous fluid conduit assembly for guiding pressurized gaseous fluid which has been released from the container to the sound generating portion of the audible alarm means and the means for controllably releasing energy includes means for disposing the valve means in an open condition in which gaseous fluid is permitted to flow from the container to the sound generating portion via the conduit assembly in response to the an initiating movement of the initiator portion.

13. An advance warning traffic safety device according to claim 7 wherein the contact element includes a sliding component and a slide frame for supporting the sliding component for sliding movement relative to the frangible seal, and the pendulum element is operable to effect sliding movement of the sliding component into seal breaking contact with the frangible seal in response to a vehicle collision with the traffic safety device.

14. An advance warning traffic safety device according to claim 13 wherein the frangible seal is a cap formed of glass or other breakable materials.

15. An advance warning traffic safety device according to claim 12 wherein the, pressurized gaseous fluid contained in the container comprises non-toxic, non-electrically charged, and environmentally safe composite materials.

16. An advance warning traffic safety device comprising:
   a support structure having a base portion constructed for disposing said support structure in a displaceable traffic path from which the support structure is displaceable upon collision therewith by an errant vehicle which has strayed from the traffic path;
   a horn mounted in said support structure for broadcasting an audible alarm to warn persons down road of the traffic safety device of an errant vehicle collision with the traffic safety device;
   a container mounted in said support structure having pressurized gaseous fluid therein and an outlet for release therethrough of pressurized gaseous fluid;
   a gaseous fluid conduit assembly mounted in said support structure for guiding pressurized gaseous fluid which has been released from the container to the horn to thereby produce an audible alarm;
   a frangible cap sealingly disposed on the container outlet for preventing release of pressurized gaseous fluid from the container into the conduit assembly; and
   an initiator device mounted in said support structure for breaking the frangible cap in response to a vehicle collision with the traffic safety device to thereby effect release of gaseous fluid to the horn for sounding an audible alarm.

* * * * *

UNITED STATES PATENT AND TRADEMARK OFFICE
CERTIFICATE OF CORRECTION

PATENT NO. : 5,265,556

DATED : November 30, 1993

INVENTOR(S) : J. Rodney Hall

It is certified that error appears in the above-identified patent and that said Letters Patent is hereby corrected as shown below:

Drawing Sheet 5 of 5: At the bottom of the drawing, insert -- Fig. 5 --.

Column 12, line 15, after "the" delete ",".

Column 12, lines 22-23, after "displaceable" insert -- generally free standing position adjacent a vehicle --.

Signed and Sealed this

Ninth Day of August, 1994

Attest:

BRUCE LEHMAN

*Attesting Officer*  *Commissioner of Patents and Trademarks*